United States Patent [19]
Paulson et al.

[11] Patent Number: 5,459,935
[45] Date of Patent: Oct. 24, 1995

[54] LEVEL SQUARE

[76] Inventors: Eldon D. Paulson, 8781-B Mercadante La., Colton, Calif. 92324; Gregory A. Paulson, 207 Knox St., #C, Costa Mesa, Calif. 92627

[21] Appl. No.: 321,562

[22] Filed: Oct. 12, 1994

[51] Int. Cl.⁶ .................. B43L 7/10; G01C 9/00
[52] U.S. Cl. .................. 33/451; 33/471; 33/499
[58] Field of Search .............. 33/451, 452, 465, 33/471, 498, 499

[56] References Cited

U.S. PATENT DOCUMENTS

| | | |
|---|---|---|
| 101,773 | 4/1870 | Sharp . |
| 339,287 | 4/1886 | Gates .......................................... 33/465 |
| 359,372 | 3/1887 | Warnock . |
| 363,491 | 5/1887 | Van Amringe . |
| 616,179 | 12/1898 | Bealer et al. . |
| 716,851 | 12/1902 | Auringer ..................... 33/499 |
| 732,827 | 7/1903 | Chambers ..................... 33/465 |
| 792,480 | 6/1905 | Wages . |
| 1,121,303 | 12/1914 | Smith ..................... 33/499 |
| 1,840,135 | 1/1932 | Schutt . |
| 2,250,830 | 7/1941 | Gonzales . |
| 2,802,259 | 8/1957 | Stoner . |
| 3,568,322 | 12/1968 | Showers . |
| 4,317,289 | 3/1982 | Conn ..................... 33/451 |
| 4,438,538 | 3/1984 | Larsen . |
| 4,481,720 | 11/1984 | Sury . |
| 4,733,477 | 3/1988 | Fincham et al. ..................... 33/471 |
| 4,916,822 | 4/1990 | Johnson ..................... 33/465 |
| 4,920,658 | 5/1990 | Hile ..................... 33/499 |

FOREIGN PATENT DOCUMENTS

| | | |
|---|---|---|
| 937003 | 11/1973 | Canada . |
| 308201 | 9/1955 | Switzerland ..................... 33/451 |
| 4810 | 2/1909 | United Kingdom ..................... 33/465 |

*Primary Examiner*—Thomas B. Will
*Attorney, Agent, or Firm*—Knobbe, Martens, Olson & Bear

[57] ABSTRACT

A combination tool for craftsmen including a square, a level, a plumb indicator, a slope measurement device, a linear scale, and a straight edge. The tool includes a pair of elongated members joined at a hinge with a protractor scale for measuring the angle between the members. The hinge comprises a sturdy clevis arrangement which allows a central fastening assembly to be tightened to provide friction in order to set the angle between the two arms without other locking structure. A series of markings along one edge of each of the members provides a linear scale. Each of the elongated members have an I-beam construction with a central web and a pair of side flanges. A number of elongated cutouts are provided for handles. A second series of cutouts are provided to position a plurality of spirit level indicators. Some of the spirit level indicators are aligned along the longitudinal axis of the members, while others are positioned transverse to the longitudinal axis. An adjustable level indicator allows the measurement of the inclination of one or more surfaces on which the tool is positioned.

3 Claims, 6 Drawing Sheets

LEVEL SQUARE

FIELD OF THE INVENTION

The present invention generally relates to a combination tool for craftsman and, more particularly, to a combination level, square, protractor, plumb, and measuring tool.

BACKGROUND OF THE INVENTION

Craftsmen such as carpenters, contractors, engineers, and cabinet makers, for example, repeatedly make use of several basic tools in their jobs. Some of the most commonly used tools include scales, squares, levels, protractors, straight edges, plumbs, among others. There have been numerous attempts in the past to combine several of these commonly used tools into one for convenience. For example, U.S. Pat. No. 4,481,720, issued to Sury, discloses a combined level and protractor in which the level spirit vials can be recalibrated. A protractor arm pivots from a recess within the main body to a 90° position. A stop structure including a thumb wheel and a lead screw shaft can be used to fix the angular position of the protractor arm. In another example, U.S. Pat. No. 101,773, issued to Sharp, discloses a tool having a main body with a spirit level therein and an arm pivotable from the main body for use as a bevel. Finally, Warnock, in U.S. Pat. No. 359,372, discloses a combination tool having a pair of straight edges with spirit levels connected at right angles to each other for use as both a level and a plumb indicator.

Despite this long recognized need, no such combination tool has proved acceptable in the construction setting. Accordingly, there remains a need for a device combining both a level and a square along with an apparatus for measuring slopes and for determining plumb lines.

SUMMARY OF THE INVENTION

The various aspects of the present invention overcome the drawbacks of the prior art by providing a simple, reliable, sturdy and inexpensive combination tool combining a level and a square.

In accordance with the present invention, a combination tool comprises an elongate first arm, an elongate second arm, and a pivot defining an axis of rotation between the first and second arms. The first arm includes a first hinge portion defining first and second abutment surfaces, and said second arm includes a second hinge portion defining third and fourth abutment surfaces. The first arm defines a first straight edge, while the second arm defines a second straight edge, said straight edges extending along the lengths of said arms. The first and third abutment surfaces limit relative rotation of the first and second arms relative one another in at least one direction when the first and second straight edges together define a 90° angle. The second and fourth abutment surfaces limit relative rotation of the first and second arms relative one another in at least one direction when the first and second straight edges together define a 180° angle. Both the first and second arms include spirit level tubes mounted thereon.

In accordance with a preferred aspect of the present invention, the first and second arms extend at least one foot in length, but may be shorter for small scale versions. More particularly, the first arm is preferably at least 18 inches in length. The combination tool further includes indicia indicating the relative angle between the first and second straight edges when the arms are angled with respect to one another.

Furthermore, the tool preferably includes a lock for securing the first straight edge in a fixed position relative the second straight edge. The lock may comprise an adjustable clamp which selectively applies varying levels of resistance to rotation between the first and second hinge portions. The preferred combination tool includes a first spirit level tube mounted on the first arm perpendicular to the first straight edge, a second spirit level tube mounted on the second arm and parallel to the second straight edge, a third spirit level tube mounted on the first arm and parallel to the first straight edge, and a fourth spirit level tube mounted on the second arm and perpendicular to the second straight edge.

Thus, the combination tool of the present invention recognizes that the primary use of the tool will be as a square or a level, and that the accuracy of the tool for both of these purposes is critical to its value to the user. Accordingly, the tool can be rapidly adjusted from a ninety degree configuration to a one hundred eighty degree configuration without the use of tools or accessories. Furthermore, by rotating the arms with respect to one another until the cooperating abutment surfaces contact one another to prevent the further rotation of the arms, the user can ensure that the tool is precisely set to the desired angle, be it ninety or one hundred and eighty degrees. It will be recognized that even small errors in these angles will result in improper construction by parties relying on the accuracy of the combination tool.

Advantageously, the tool makes use of the length of both of its arms so that the level can measure the flatness of a surface over a greater length so that the accuracy of the reading and the usefulness of the tool for measuring large surfaces such as floors is enhanced.

Yet another important aspect of the present invention is the ability of the structural design of the combination tool to withstand the sometimes extreme demands made on the tools of the worker. That is, the present design is adapted to continue to function properly and accurately, despite weather conditions and general wear and tear.

Another aspect of the invention is a combination tool having an elongate first arm including a first hinge portion and defining a first abutment surface is pivotably mounted to an elongate second arm including a second hinge portion and defining a second abutment surface. The first arm defines a first straight edge extending along its length and the second arm defines a second straight edge extending along its length. The first abutment surface and the second abutment surface limit relative rotation of the first arm with respect to the second arm in at least one direction when the first and second straight edges together define a 90° angle. The first and second straight edges contact one another when they form a 90° angle. The first arm may include a third abutment surface and the second arm may include a fourth abutment surface. The second and fourth abutment surfaces limit relative rotation of the first and second arms in at least one direction when the first and second straight edges together form a 180° angle.

Significantly, because the first and second contact surfaces contact one another when they form a ninety degree angle, the usefulness of the tool as a square is enhanced, particularly for laying out corners.

Yet another aspect of the invention is a combination tool including an elongate first arm having a first hinge portion which defines an upper plate, a lower plate and a middle vertical wall extending between the upper and lower plates. The upper and lower plates and middle vertical wall form a channel therebetween. The upper and lower plates defines axially aligned interior cylindrical surfaces. The upper and lower plates further define exterior cylindrical surfaces axially aligned with the interior cylindrical surfaces. The first arm defines a first flat surface and a first spirit level tube mounted thereon perpendicular to the first flat surface. The first arm also includes a second spirit level tube mounted thereon parallel to the first flat surface.

The combination tool further includes an elongate second arm having a second hinge portion mounted to an end thereof defining an upper vertical wall, a lower vertical wall and a pivot plate extending horizontally between the upper and lower vertical walls. The pivot plate extends into the channel between the upper and lower plates of the first hinge portion. The pivot plate defines a middle interior cylindrical surface. The second arm defines a second flat surface, and includes a third spirit level tube mounted thereon parallel to the second flat surface. A shaft extends through the interior cylindrical surface of the upper and lower plates and the pivot plate to define an exterior surface about which the middle interior cylindrical surface is rotatable. The angle between the first and second flat surfaces can be varied by rotating the middle interior cylindrical surface. During rotation of the first and second arms, the upper and lower exterior cylindrical surfaces maintain contact with the upper and lower vertical walls, respectively.

The combination tool also comprises a stop positioned within the channel, and the pivot plate comprises a first shoulder positioned to contact the stop to limit rotation of the arms to a maximum 180° angle with respect to one another. The tool further includes a second shoulder positioned to contact the stop to limit rotation of the arms to a minimum 90° angle relative one another. The pivot plate of the tool includes a middle distal portion defining a middle exterior cylindrical surface axially aligned with the middle interior cylindrical surface. The stop is positioned to maintain contact with the middle interior cylindrical surface as the first and second arms are rotated.

The foregoing structural configuration enables the combination tool to resist twisting and bending moments applied to the tool during mishandling and transport. Further, these same cooperating surfaces ensure that the accuracy of the tool is maintained despite constant wear and tear on the components. That is, rather than relying on a the interaction of only a pair surfaces at a single location on the tool to ensure the accuracy of the rotational movement is maintained, the tool relys on multiple pairs of cooperating surfaces, positioned a different locations axially and radially relative the axis of rotation to ensure that the desired relationship between the arms is maintained.

DESCRIPTION OF THE PREFERRED EMBODIMENTS

Figure 1:
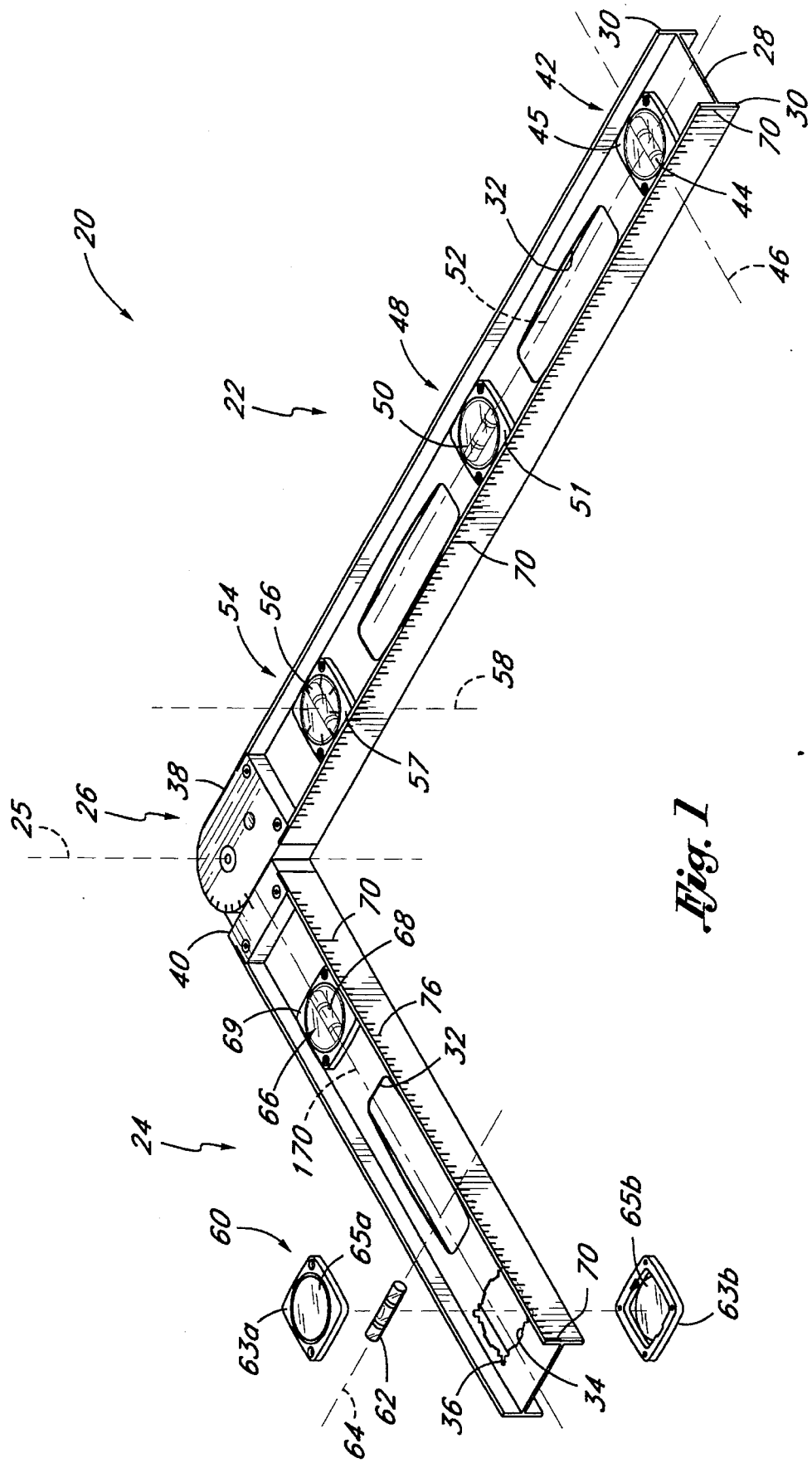
FIG. 1 is a perspective view of a preferred combination tool of the present invention.

FIG. 1 illustrates the preferred combination tool or level square 20 of the present invention. The level square 20 generally comprises a pair of arms 22, 24 having ends attached pivotably about an axis 25 at a hinge 26. The arms 22, 24 may be constructed of varying lengths, and may be the same or different lengths. In the presently illustrated embodiment, a long arm 22 is pivotably attached at one end via the hinge 26 to a short arm 24. The long arm 22 is approximately one and one-half times the length of the short arm 24.

Each arm 22, 24 utilizes a rigid I-beam construction with a central planar web 28 and a pair of opposed flanges 30 perpendicular to the web. Each flange 30 provides two parallel straight edges which are aligned with the straight edges of the other flange to define planes parallel to and spaced from the web 28. Further, the exterior side of each flange 30 defines a flat surface perpendicular to both the web 28 and the planes defined by the straight edges. The web 28 is interrupted by one or more cutouts 32 to provide handles for the level square 20. The cutouts 32 are at least four inches long and approximately one inch wide with rounded inside edges. The cutouts 32 may be formed of different sizes and shapes, but are preferably designed for insertion of the craftsman's hand for carrying the level square 20. The web 28 of each of the arms 22, 24 also exhibits one or more spirit level apertures 34. The apertures 34 are designed to receive spirit levels, as will be described below, and include a plurality of fastener slots 36. A first hinge block 38 is fixed to one end of the long arm 22 and pivotally couples with a second hinge block 40 fixed to an end of the short arm 24. The first hinge block 38 and second hinge block 40 together comprise the major elements of the hinge 26. Although shown as separate elements, the hinge blocks 28, 40 may be constructed integrally with the arms 22, 24.

Figure 2:
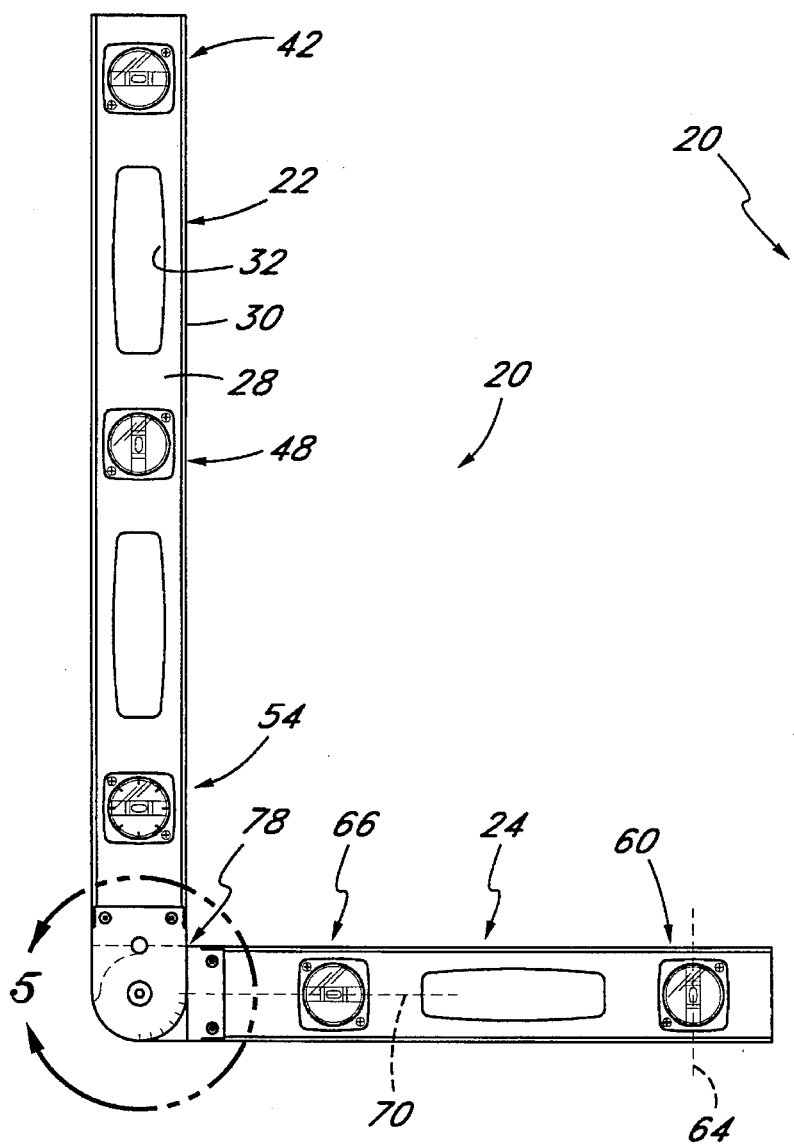
FIG. 2 is a top plan view of the combination tool of FIG. 1 adapted for use as a square.
Figure 3:
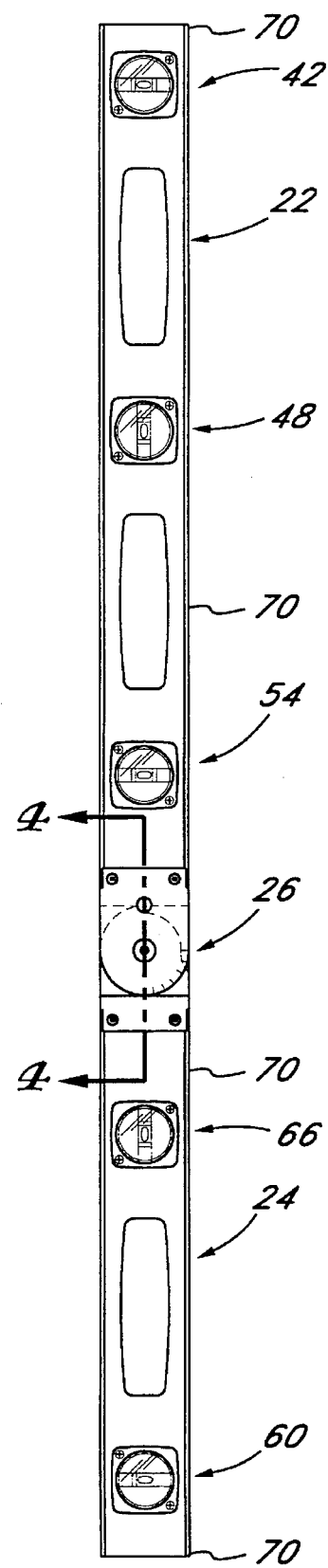
FIG. 3 is a top plan view of the combination tool of FIG. 1 adapted for use as a straight edge or plumb line indicator.

Looking at FIGS. 1–3, the long arm 22 includes a plumb indicator 42 fastened within the spirit level aperture 34 farthest from the hinge 26. This plumb indicator 42 may comprise a spirit level tube 44 mounted within a housing 45 and oriented along a transverse axis 46 of the long arm 22. At the approximate midpoint of the long arm 22, a level indicator 48 is fastened within one of the spirit level apertures 34 and may comprise a spirit level tube 50 mounted within a housing 51 and aligned along a longitudinal axis 52 of the long arm 22. Finally, an adjustable level indicator 54 is fastened within the spirit level aperture 34 closest to the hinge 26. This adjustable level indicator 54 may include a spirit level tube 56 mounted within a housing 57 which is rotatable about a lateral axis 58. The adjustable level indicator 54 may also comprise a compass-like dial indicator for measuring angles. The function and use of the adjustable level indicator 54 will be described more fully below with reference to FIG. 8.

Now looking at the short arm 24, a plumb indicator 60 is fastened within the spirit level aperture 34 farthest from the hinge 26. The plumb indicator 60 may include a spirit level tube 62 mounted within a housing 63 and oriented along a transverse axis 64 relative to the short arm 24. The plumb indicator 60 is shown exploded, illustrating identical housing halves 63a, 63b with viewing windows 65a, 65b therein. All of the level indicators include such a split housing.

Closer to the hinge 26, and across one of the cutouts 32 from the plumb indicator 60, a level indicator 66 is fastened within one of the spirit level apertures 34. The level indicator 66 may include a spirit level tube 68 mounted in a housing 69 and oriented along a longitudinal axis 170 of the short arm 24. Each of the spirit level indicators 42, 48, 54, 60, and 66 are protected from impact by the flanges 30 on either side of the web 28. Thus, if the level square 20 is dropped, the indicators are substantially protected from damage.

With reference to FIGS. 2 and 3, the level square 20 may be configured as a square or a straight beam, respectively. More particularly, the long arm 22 and short arm 24 can be aligned, as in FIG. 3, or can be pivoted with respect to each other to define a right angle, as in FIG. 2. These are the two most common orientations, although the arms 22, 24 can be oriented at any angle between 90° and 180°, as will be described below.

In the square configuration of FIG. 2, the level square 20 can be utilized to layout perpendicular lines, or check the perpendicularity of adjacent surfaces. Furthermore, the level indicators 48 and 66 in the respective arms allow the craftsman to check the flatness of an upper surface while at the same time checking the squareness of an adjacent corner. When converted to the straight beam, as in FIG. 3, the tool 20 defines an elongated level combining the indicators 48 and 66. Advantageously, the tool 20 can be extended significant distances to provide greater accuracy in level measurements. Desirably, the legs 22, 24 are at least one foot long, and the long arm is preferably at least 18 inches long. The tool 20 when extended may be provided in lengths of between 2 and 6 feet. In small scale versions, the arms 22, 24 may be as small as 6 inches, but the hinge 26 components preferably remain full size.

When in the straight beam configuration, the tool 20 can be used to check or set plumb lines. More particularly, the level square 20 is placed against a surface to be checked, and an inspection of the plumb indicators 42, 60 determines whether the surface is actually vertical. As will be appreciated, the air bubble within the spirit level tubes 44, 62 will be exactly in the center of the tubes if the particular surface is actually vertical.

The preferred level square 20 also can be used as a scale or straight edge. More specifically, at least one flange 30 of each of the long and short arms 22, 24 includes a series of distance markings 76 thereon. In the straight beam orientation of FIG. 3, the marking 76 on both of the arms 22, 24 are aligned to define an elongated scale. This scale preferably has indicia or markings 76 in increments of 1/16 inch. Furthermore, highly visible stud separation indicators 70 at 16 inches apart are preferably provided. The level square 20 thus functions as a linear measuring tool in either the straight orientation of FIG. 3, or the right angle orientation of FIG. 2. Moreover, the exterior flat surfaces of the flanges 30 provide excellent straight edges for lay-out work. As will be more fully described below, the hinge 26 exhibits a straight edge all the way along the interior of the square 20 in FIG. 2 from each end of the arms 22, 24 to a corner 78.

Now with reference to FIGS. 4–7, the preferred precision hinge 26 of the present invention will be described. As previously mentioned, the hinge 26 comprises the first hinge block 38 pivotably connected to the second hinge block 40 about the pivot axis 25. As seen best in FIGS. 6 and 7, the first hinge block 38 includes a pair of spaced-apart upper and lower clevis plates 80a, 80b defining a channel or slot 82 therebetween. A vertical wall 83 connects the clevis plates 80a,b at the rear of the slot 82. The clevis plates 80a,b extend perpendicularly from the vertical wall 83 to terminate in upper and lower cylindrical surfaces 81a, 82b, respectively. The second hinge block 40 includes a pivot plate 84 sized to closely fit within the slot 82. Aligned apertures in the plates 80a,b and 84 receive fasteners to couple the two blocks 38, 40 together and provide a pivoting means. More specifically, a fastener shaft or sleeve 86 fits into a cylindrical counterbored hole 88 in the upper clevis plate 80a. The fastener sleeve 86 includes a dead-end threaded bore for receiving a hinge tightness screw 90 inserted into a countersunk hole 92 in the opposite clevis plate 80b.

Figure 4:
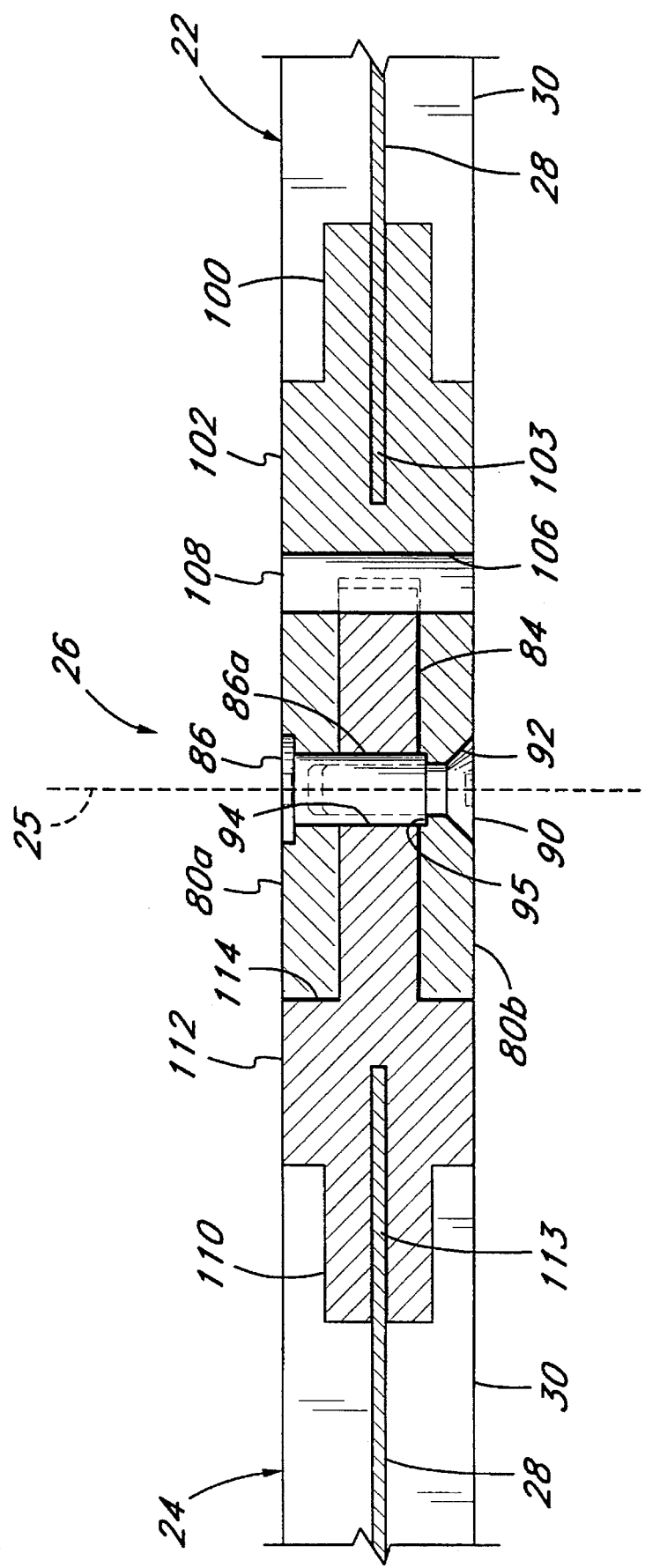
FIG. 4 is a cross-sectional view through a preferred hinge of the combination tool taken along line 4—4 of FIG. 3.

As seen in FIG. 4, the fastener sleeve 86 extends through a cylindrical bore 94 in the pivot plate 84 and terminates in a counterbore 95 on the inner surface of the second clevis plate 80b. The upper and lower cylindrical surfaces 81a,b of the clevis plates 80a,b are axially aligned with, and preferably coaxial with respect to, both the bore 94 and counterbore 95. The shank portion 86a of the fastener sleeve 86 thus defines a pivot surface for the bore 94 of the pivot plate 84. The outer diameter of the shank portion 86a is preferably sized slightly smaller than the bore 94 to allow relative rotation therebetween. Desirably, the diameter of the bore 94 is approximately 0.003 inches larger than the diameter of the shank portion 86a. As the screw 90 is tightened within the fastener sleeve 86, the two clevis plates 80a,b are squeezed together to clamp onto the pivot plate 84. The range of adjustments for the hinge tightness screw 90 is from the point where the clevis plates 80a,b essentially do not resist movement of the pivot plate 84, permitting free rotation of the arms 22 and 24, to the point where the clamping force of the clevis plates 80a,b on the pivot plate 84 locks the arms 22 and 24 with respect to one another. In-between, the screw 90 may be adjusted to provide varying degrees of friction to allow a craftsman to set and temporarily hold a particular angle between the arms 22, 24 without any other locking structure so long as sufficient force is not exerted to overcome the force of friction.

Figure 5:
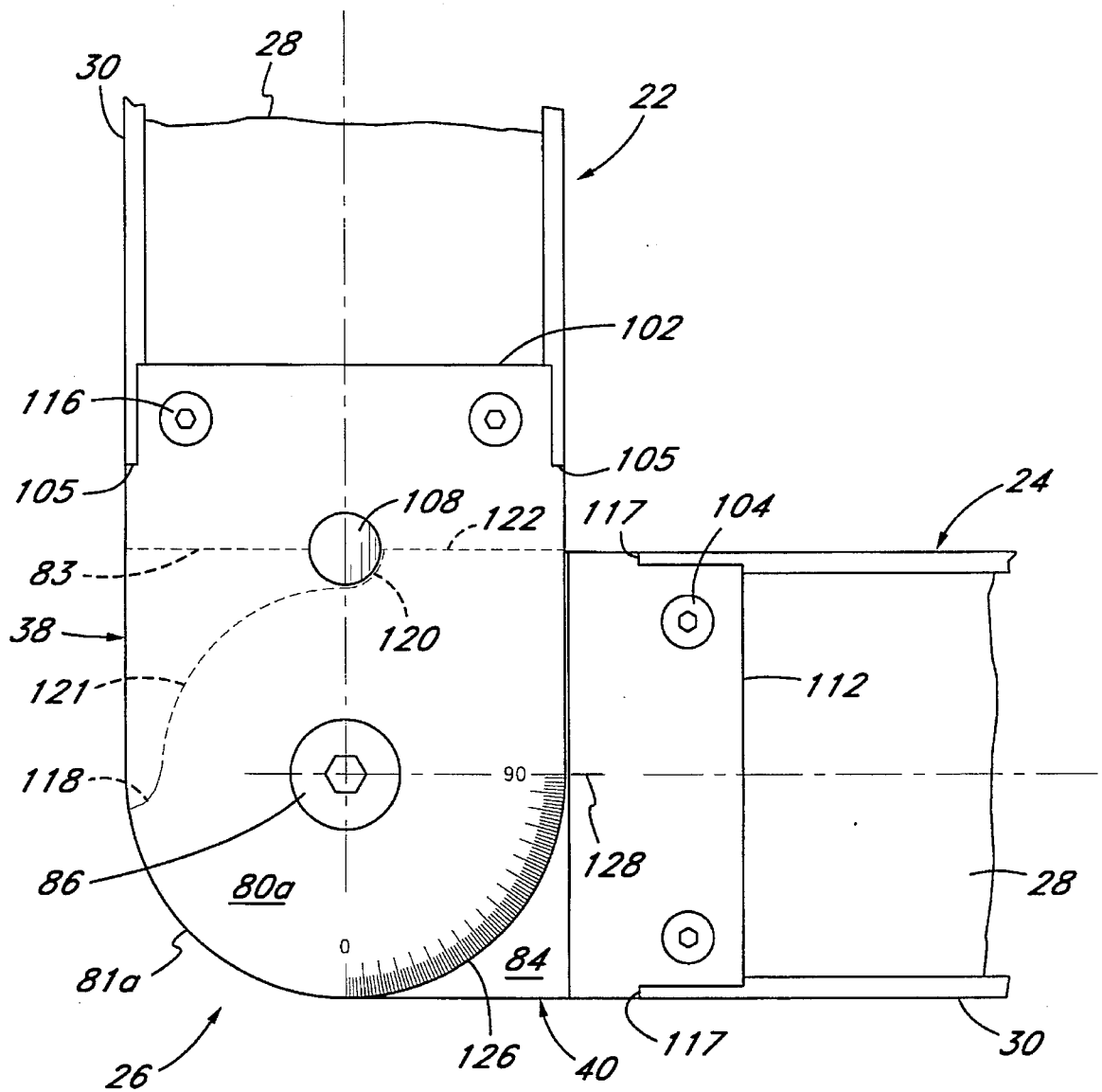
FIG. 5 is a detailed plan view of the hinge of the combination tool showing protractor markings.

With reference to FIG. 5, the first hinge block 38 includes an attachment portion 102 and the aforementioned clevis plates 80a,b. As seen in FIG. 4, a slot 103 extends a distance into the attachment portion 102 for receiving the web 28 of the long arm 22. A pair of fasteners 116 extend through the attachment section 102 and web 28 to fasten the long arm 22 to the first hinge block 38. The flanges 30 of the long arm 22 extend on either side of the attachment portion 102 to terminate at the same location as the web 28 within the hinge block 38. The flanges abut against a pair of external shoulders 105 on the sides of the attachment portion 102. A throughbore 106 from an upper surface to a lower surface of the first hinge block 38 receives a stop pin 108. As seen best in FIG. 5, the throughbore 106 is positioned so that the stop pin 108 is partially visible within the clevis slot 82.

The second hinge block 40 comprises an attachment portion 112 as well as the aforementioned pivot plate 84. A slot 113 receives the web 28 of the short arm 24. The attachment portion 112 has a thickness approximately equal to the height of the flanges 30. A step 114 provides a transition between the thickness of the attachment portion 112 and pivot plate 84. The step 114 forms short vertical walls above and below the pivot plate 84. A pair of fasteners 104 extend through the attachment portion 112 and through the web 28 of the short arm 24. In this manner, the short arm 24 and second hinge block 40 are securely fastened together. Again, the flanges 30 on the short arm 24 extend on either side of the attachment portion 112 to the terminate at the same location as the web 28. Likewise, the flanges abut against a pair of external shoulders 117 on the sides of the attachment portion 112.

The pivot plate 84 has a generally semicircular configuration with a pair of shoulders or stop surfaces 118, 120 designed to interact with the stop pin 108. The stop surfaces 118,120 define the limits of a cylindrical exterior surface 121 therebetween. The surface 121 is axially aligned and coaxial with the pivot axis 25, and preferably extends radially from the pivot axis to remain essentially in contact with the stop pin 108. The first stop surface 118 provides a positive structure which is positioned radially from the pivot axis 25 the same distance as the stop pin 108. The stop surface 118 is positioned generally along the centerline of the longitudinal axis 170 of the short arm 24. In this configuration, the stop surface 118 provides a 0° abutment surface for the relative pivoting of the long arm 22 and short arm 24, as seen in FIG. 3. The positive structural interference ensures an accurate, repeatable and simple indication that the arms 22, 24 are aligned. The second stop surface 120 is positioned at the same radial distance from the pivot axis as the first stop surface 118 but is arranged to abut the stop pin 108 when the long arm 22 and short arm 24 are at right angles to each other. This can best be seen in FIG. 5.

Figure 7:
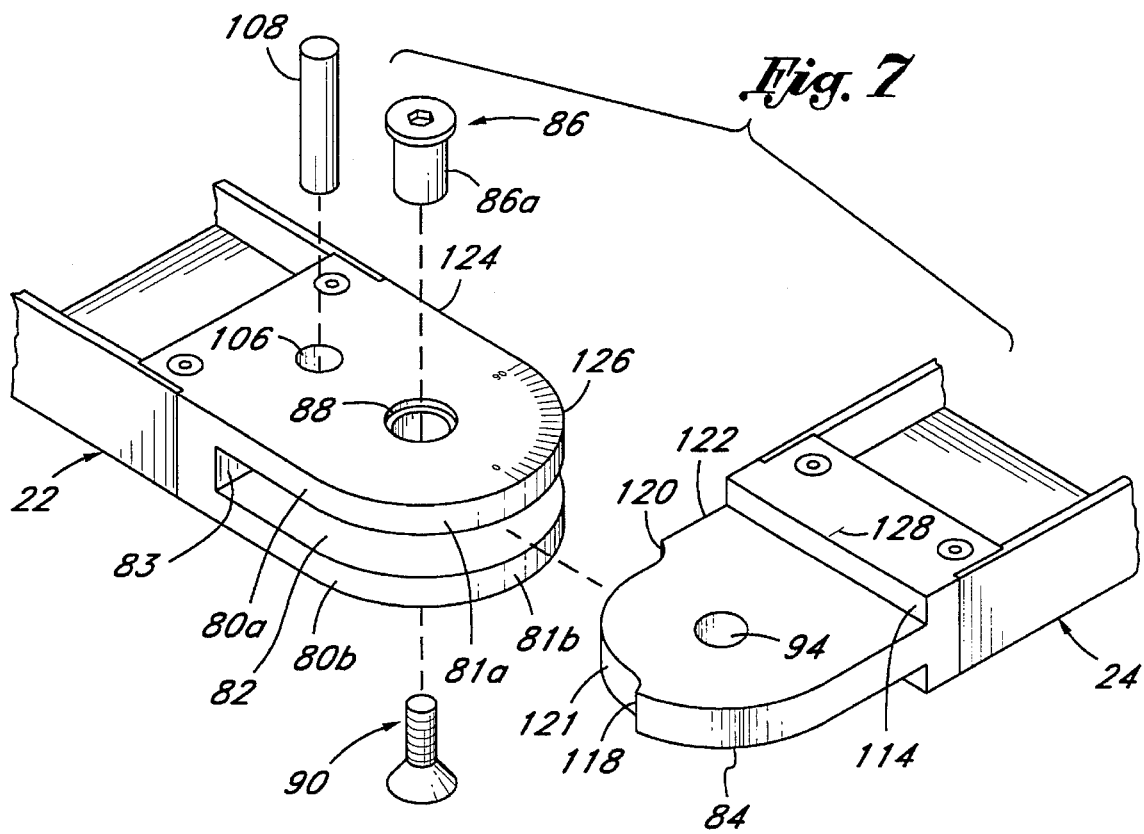
FIG. 7 is an exploded perspective view of the hinge of the combination tool.
Figure 6:
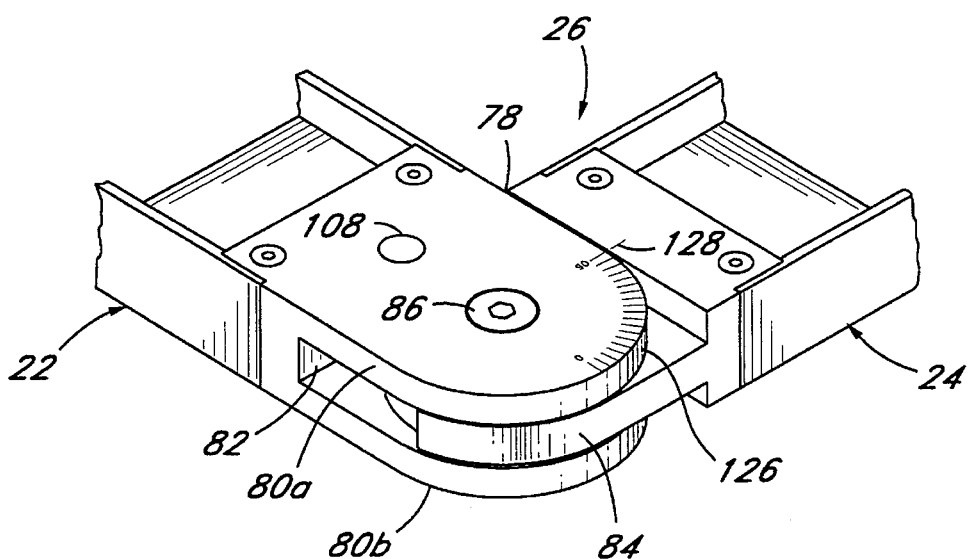
FIG. 6 is an enlarged perspective view of the hinge of the combination tool.

As shown in FIG. 7, the pivot plate 84 further includes a straight edge portion 122 adjacent the second stop surface 120 which provides an extension of one of the flanges 30 of the short arm 24. A straight edge portion 124 on the first hinge block 38 combines with the first straight edge portion 122 to form the corner 78 at all angular orientations between the long arm 22 and short arm 24. Thus, a craftsman can scribe an uninterrupted line along adjacent flanges 30 all the way to the corner 78 at all angular positions of the level square 20. Moreover, the straight edge portion 122 provides an abutment surface which contacts the vertical wall 83 of the slot 82 when the arms 22, 24 are at right angles. This is best seen in FIG. 5 and further ensures an accurate and rugged 90° angle indicator.

As mentioned previously, the present tool 20 can be oriented so that the arms 22 and 24 form various inclusive angles between 90° and 180°. In order to determine the particular angular orientation between the long arm 22 and short arm 24, a protractor scale 126 and angle pointer 128 are provided. The protractor scale 126 is inscribed on an exterior surface of the clevis plate 80a, while the angle pointer 128 is inscribed on a terminal end of the attachment portion 112 of the second hinge block 40. The protractor scale 126 is given at angular increments from 0° to 90° and this indicates the angle one of the arms 22 or 24 makes with respect to a projected line along the other arm and through the pivot axis 25. The protractor scale 126 is formed in a quadrant of the clevis plate 80a so that the 90° marking lines up with the angle pointer 128 when the long arm 22 is at right angles to the short arm 24, as seen in FIG. 5. It will be easily understood that when the two arms 22, 24 are aligned in parallel, the 0° marking of the protractor scale 126 is aligned with the angle pointer 128. The resolution of the increments of the protractor scale 126 may be as small as lines can be visibly scribed in the surface of the clevis plate 80a. Desirably, there are ½° increments inscribed on the protractor scale between 0° and 90°. The preferred minimum lengths of at least one foot of both the arms 22, 24 facilitates accuracy in measuring angles. More specifically, a relatively long line may be drawn along either arm with better accuracy than marking a short angle and extending it.

The preferred arrangement of the clevis plates 80a,b surrounding the pivot plate 84, and the combination of the fastener sleeve 86 and tighten screw 90, allows for a frictional coupling of the long arm 22 and short arm 24. In this manner, the arms can be oriented at any angle between 0° and 90°, as determined by the protractor scale 126 and pointer 128, and remain at that angle without separate locking structure.

Figure 8:
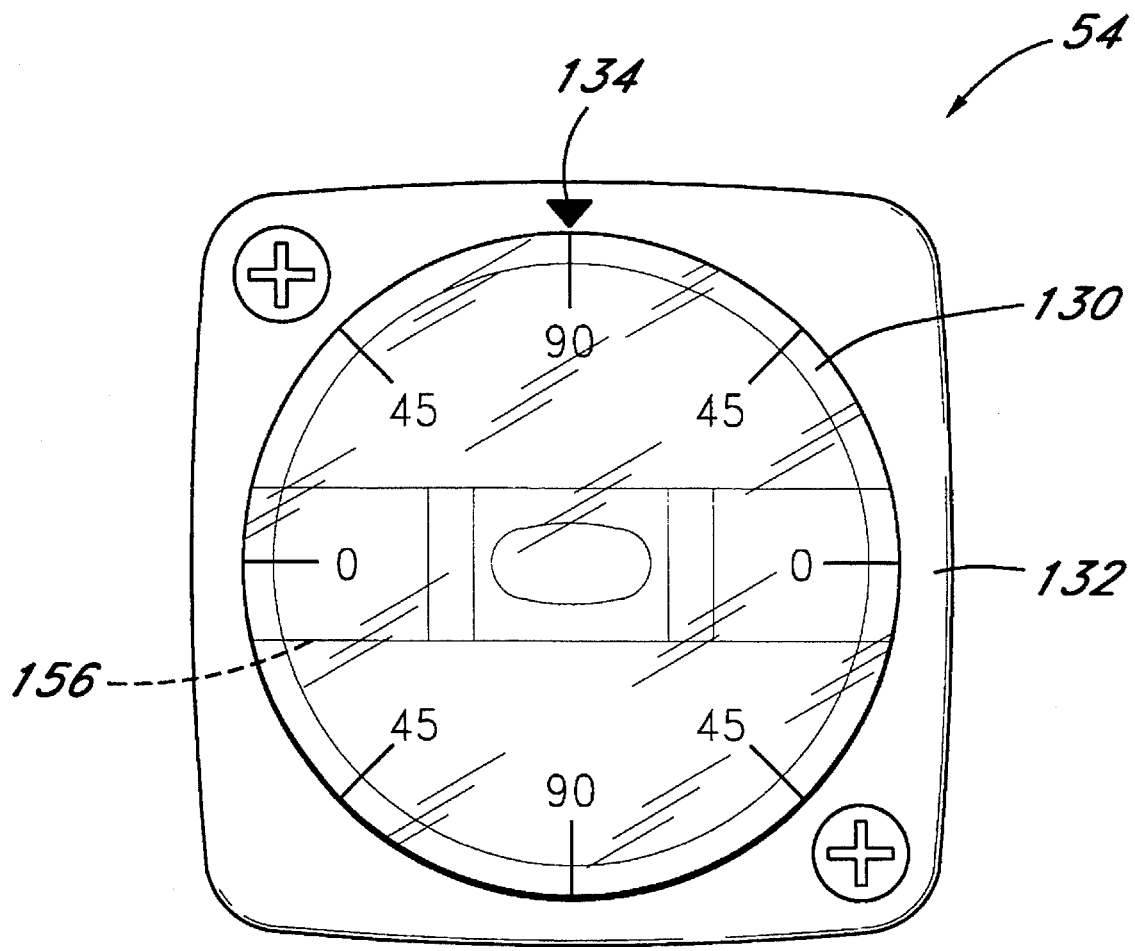
FIG. 8 is a top plan view of an adjustable level indicator for use in the combination tool.

The present level square 20 can also be utilized to measure the slope of a particular surface. The aforementioned adjustable level indicator 54 positioned along the long arm 22 allows for this function. As seen in FIG. 8, the adjustable level indicator 54 includes a central dial 130 rotationally disposed within a housing 132. The dial 130 provides angular markings around its periphery for registering with a pointer 134. The spirit level tube 56 is fixedly attached at a predetermined orientation with respect to the rotating dial 130. As seen in FIG. 1, the inner dial 130 and spirit level tube 156 rotate relative to an axis 58 parallel to the pivot axis 25 of the tool 20. When either flange 30 of the long arm 22 is placed on an inclined surface, the adjustable level indicator 54 is used to measure the angle of inclination. To do this, the inner dial 130 along with the spirit tube 56 is rotated until the air bubble in the spirit tube is centered therein. In this position the pointer 132 lines up with one of the angle markings on the indicator dial 134 which can be used to determine the angle of inclination, as will be readily appreciated by one of skill in the art. Furthermore, knowing the angle of inclination of the long arm 22, and knowing the relative angle between the long arm and the short arm 24 via the protractor scale 126, the angle of inclination of a second surface on which the short arm is aligned can be determined. This is simply a matter of a short geometric calculation as will be appreciated by those of skill in the art. Thus, the adjustable level indicator 54 need only be leveled once to determine the angle of inclination of two adjacent surfaces.

In accordance with a preferred construction of the level square 20, the arms 22, 24 and hinge 26 are made of a suitably strong and lightweight material to withstand rugged treatment at construction sites yet be easy to manipulate and use. In one form, the arms 22, 24 are extruded and machined aluminum, while the hinge blocks 38, 40 are machined aluminum. It is contemplated that other metals or materials such as nylon may be substituted.

While the above description presents the preferred embodiment, the present invention may be embodied in other specific forms without departing from its spirit or essential characteristics.

We claim:

1. A combination tool, comprising:

a first elongate arm having a first end, a second end, a first outermost side and an opposing second outermost side;

a first spirit level tube mounted on said first arm;

a first hinge portion detachably mounted on said first arm having a first end, a second end, a first outermost side and an opposing second outermost side, said first side of said first hinge portion defining a first planar surface coplanar with said first side of said first arm, said second side of said first hinge portion defining a second planar surface coplanar with said second side of said first arm, said first hinge portion defining an upper plate, a lower plate and a middle vertical wall extending between said upper plate and said lower plate, said upper plate, said lower plate and said middle vertical wall cooperating to form a channel between said upper plate and said lower plate, said upper plate defining an upper interior cylindrical surface and said lower plate defining an axially aligned lower interior cylindrical surface, an outer periphery of said upper plate defining an upper exterior cylindrical surface axially aligned with said upper interior cylindrical surface and an outer periphery of said lower plate defining a lower exterior cylindrical surface concentric with said lower interior cylindrical surface;

a second elongate arm having a first end, a second end, a first outermost side and an opposing second outermost side;

a second hinge portion detachably mounted on said second arm having a first end, a second end, a first outermost side and an opposing second outermost side, said first side of said second hinge portion defining a first planar surface coplanar with said first side of said second arm, said second side of said second hinge portion defining a second planar surface coplanar with said second side of said second arm, said second hinge portion defining an upper planar vertical wall, a lower planar vertical wall and a pivot plate extending horizontally between said upper vertical wall and said lower vertical wall, said pivot plate extending into said channel and defining a middle interior cylindrical surface, an outer periphery of said pivot plate defining a middle exterior cylindrical surface axially aligned with said middle interior cylindrical surface;

a second spirit level tube mounted on said second arm;

a shaft extending through said plates within said interior cylindrical surfaces defining an exterior surface about which said middle interior cylindrical surface is rotatable to vary the angle between said first planar surface of said first hinge portion and said first planar surface of said second hinge portion, said upper exterior cylindrical surface maintaining continuous contact with said upper vertical wall and said lower exterior cylindrical surface maintaining continuous contact with said lower vertical wall as said arms are rotated and said first planar surface of said first hinge portion abutting said upper vertical wall over a first planar contact area and said lower vertical wall of said second hinge portion to limit rotation of said arms when said arms form a 90° angle;

a stop positioned within said channel defining an outer cylindrical surface, said outer periphery of said pivot plate further comprising a first shoulder defining a cylindrical surface, said cylindrical surface of said stop contacting said first shoulder over a first cylindrical contact area to limit rotation of said arms when said arms form a 180° angle and said outer periphery of said pivot plate further comprising a second shoulder defining a cylindrical surface, said cylindrical surface of said stop contacting said second shoulder over a second cylindrical contact area to limit rotation of said arms when said arms form a 90° angle, said stop positioned so that said outer cylindrical surface of said stop maintains continuous contact with said middle exterior cylindrical surface as said arms are rotated; and a clamping means cooperating with said shaft to selectively exert clamping force on said upper plate and said lower plate, and thereby clamping force on said pivot plate, said upper plate further comprising indicia indicating the relative angle between said first arm and said second arm.

2. The combination tool of claim 1, wherein each of said upper exterior cylindrical surface and said lower exterior cylindrical surface extends from said first side to said second side of said first hinge portion.

3. The combination tool of claim 2, wherein said first hinge portion comprises a single piece and said second hinge portion comprises a single piece.

* * * * *